US010207644B2

(12) United States Patent
Kalms et al.

(10) Patent No.: US 10,207,644 B2
(45) Date of Patent: Feb. 19, 2019

(54) METHOD AND APPARATUS FOR DETERMINING A LOCATION OF A VEHICLE FEATURE

(71) Applicant: Aptiv Technologies Limited, St. Michael (BB)

(72) Inventors: Volker S. Kalms, Wuppertal (DE); Mathias Busch, Wuppertal (DE); Peter Egbert, Engelskirchen (DE); Wolfgang Vorwerk, Sprockhoevel (DE)

(73) Assignee: Aptiv Technologies Limited (BB)

( * ) Notice: Subject to any disclaimer, the term of this patent is extended or adjusted under 35 U.S.C. 154(b) by 325 days.

(21) Appl. No.: 14/995,410

(22) Filed: Jan. 14, 2016

(65) Prior Publication Data

US 2016/0207461 A1    Jul. 21, 2016

(30) Foreign Application Priority Data

Jan. 20, 2015    (EP) .................................... 15151850

(51) Int. Cl.
*H04N 9/47* (2006.01)
*H04N 7/18* (2006.01)
(Continued)

(52) U.S. Cl.
CPC ................ *B60R 1/002* (2013.01); *G01S 5/16* (2013.01); *G06K 9/00791* (2013.01);
(Continued)

(58) Field of Classification Search
None
See application file for complete search history.

(56) References Cited

U.S. PATENT DOCUMENTS

| 6,038,496 A * | 3/2000 | Dobler ...................... B60T 7/22 250/559.06 |
| 2004/0070509 A1* | 4/2004 | Grace .................. A61B 5/1103 340/575 |

(Continued)

FOREIGN PATENT DOCUMENTS

| DE | 10 2007 022523 A1 | 11/2008 |
| DE | 10 2014 013578 A1 | 4/2015 |

OTHER PUBLICATIONS

Tao Z, et al.: "Mapping and localization using GPS, lane markings and proprioceptive sensors", 2013 IEEE/RSJ International Conference on Intelligent Robots and Systems, IEEE, Nov. 3, 2013 (Nov. 3, 2013), pp. 406-412, XP032537362, ISSN: 2153-0858, DOI: 10.1109/IROS.2013.6696383.

(Continued)

*Primary Examiner* — Talha M Nawaz
(74) *Attorney, Agent, or Firm* — Lawrence D. Hazelton

(57) ABSTRACT

A method for determining a location of a vehicle feature of a vehicle relative to an environmental feature located in an environmental zone of the vehicle feature includes: arranging a camera at the vehicle with a fixed orientation relative to the vehicle such that the vehicle feature and an environmental zone of the vehicle feature are disposed in the field of view of the camera; generating an index in the environmental zone of the vehicle feature for determining the location of the vehicle feature relative to an environmental feature located in the environmental zone; taking a measurement image that includes the vehicle feature, the index and an environmental feature located in the environmental zone of the vehicle feature; and determining the location of the vehicle feature relative to the environmental feature with reference to the position of the environmental feature relative to the index in the measurement image.

6 Claims, 5 Drawing Sheets

(51) Int. Cl.
  *B60R 1/00* (2006.01)
  *G01S 5/16* (2006.01)
  *G06K 9/00* (2006.01)
  *G06T 7/73* (2017.01)

(52) U.S. Cl.
  CPC ............ *G06K 9/00798* (2013.01); *G06T 7/74* (2017.01); *H04N 7/183* (2013.01); *B60R 2300/307* (2013.01); *B60R 2300/60* (2013.01); *B60R 2300/804* (2013.01); *G06T 2207/20221* (2013.01); *G06T 2207/30256* (2013.01)

(56) References Cited

U.S. PATENT DOCUMENTS

2010/0253594 A1* 10/2010 Szczerba ............... G01S 13/723
    345/7
2010/0292886 A1* 11/2010 Szczerba ............... G01C 21/365
    701/31.4

OTHER PUBLICATIONS

Mertz, C, et al.: "Side collision warning systems for transit buses", Intelligent Vehicles Symposium, 2000. IV 2000. Procedings of the IEEE Dearborn, MI, USA Oct. 3-5, 2000, Piscataway, NJ, USA, IEEE, US, Oct. 3, 2000 (Oct. 3, 2000), pp. 344-349, IP010528961, DOI: 10.1109/IVS.2000.898367 ISBN: 978-0-7803-6363-2.
Aufrere, R., et al.: "Multiple sensor fusion for detecting location of curbs, walls and barriers", Proc. IEEE Intelligent Vehicle Symposium, 2003, Jun. 9, 2003 (Jun. 9, 2003), pp. 126-131, XP010645862, ISBN: 978-0-7803-7848-3.
Kellner Martin, et al.: "Road curb detection based on different elevation mapping techniques", 2014 IEEE Intelligent Vehicles Symposium Proceedings, IEEE, Jun. 8, 2014 (Jun. 8, 2014), pp. 1217-1224, XP032620308, DOI: 10.1109/IVS.2014.6856534.
Rose Christopher, et al.: "An Integrated Vehicle Navigation System Utilizing Lane-Detection and Lateral Position Estimation Systems in Difficult Environments for GPS", IEEE Transactions on Intelligent Transportation Systems, IEEE, Piscataway, NJ, USA, Bd. 15, No. 6, Dec. 1, 2014 (Dec. 1, 2014), pp. 2615-2629, XP011565370, ISSN: 1524-9050, DOI: 10.1109/TITS.2014.2321108.

* cited by examiner

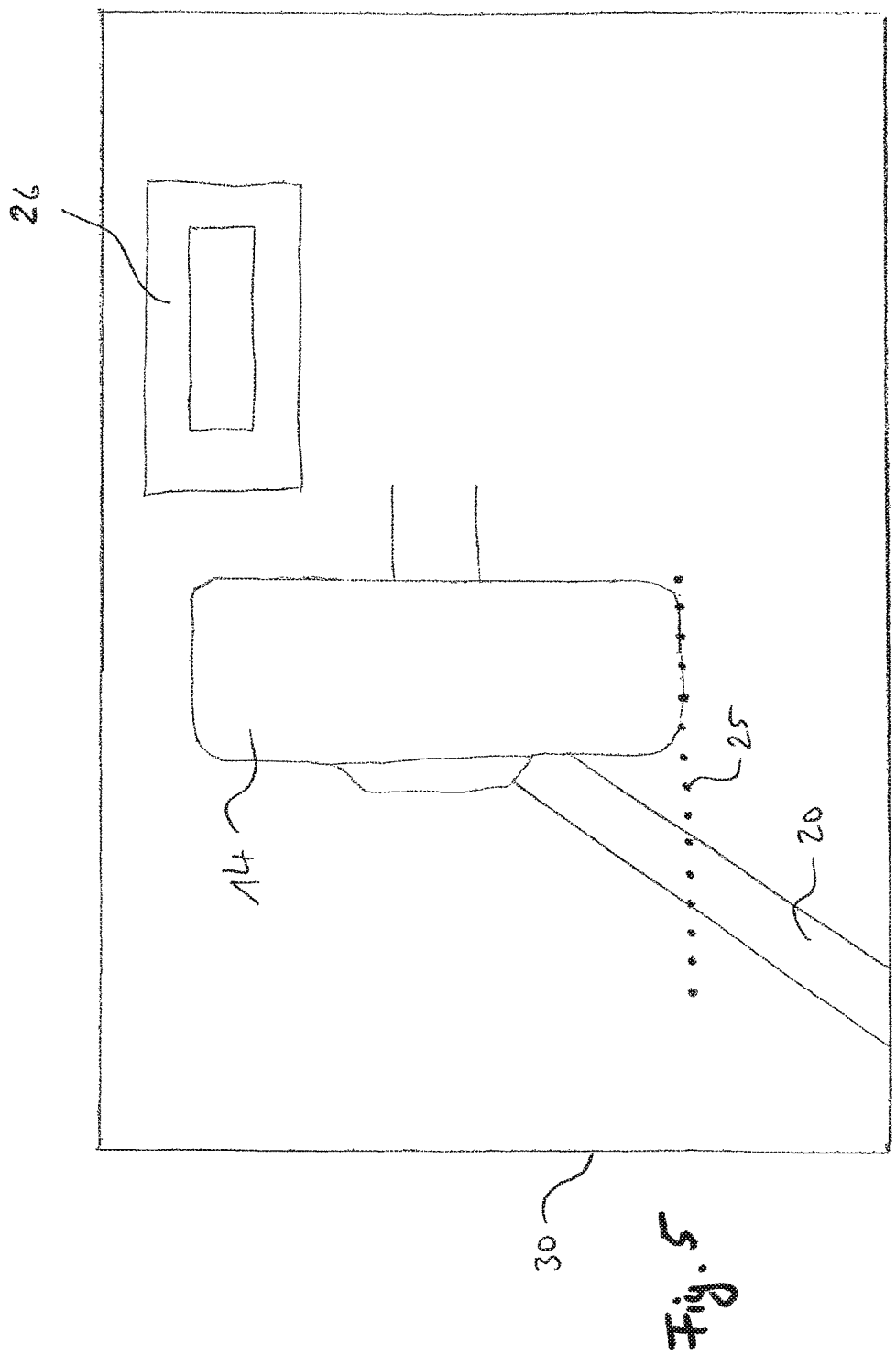

METHOD AND APPARATUS FOR DETERMINING A LOCATION OF A VEHICLE FEATURE

CROSS-REFERENCE TO RELATED APPLICATION

This application claims the benefit under 35 U.S.C. § 119(a) of European Patent Application EP 15151850.3, filed Jan. 20, 2015, the entire disclosure of which is hereby incorporated herein by reference.

TECHNICAL FIELD OF INVENTION

This disclosure generally relates to a method for determining a location of a vehicle feature of a vehicle relative to an environmental feature located in an environmental zone of the vehicle feature as well as to a method and to an apparatus for comparing a location of a vehicle feature calculated by a driver assistance system relative to an environmental feature located in an environmental zone of the vehicle feature with an actual location of the vehicle feature relative to the environmental feature.

BACKGROUND OF INVENTION

Drive assistance systems such as lane keeping assists are becoming more and more widespread. A lane keeping assist determines a lateral spacing of the vehicle relative to a lane marking during travel. This spacing is e.g. calculated on the basis of images of a front camera. The front camera is arranged in the region of a windshield of the vehicle and its field of view inter alia detects a road disposed in front of the vehicle. The vehicle itself is, however, not in the field of view of the front camera. The lateral spacing of the vehicle relative to a road marking is therefore calculated using the road markings visible to the front camera in conjunction with information on the position of the front camera in the vehicle.

It is in particular desired in a calibration and/or validation of such a driver assistance system to compare the spacing of the vehicle from the road marking calculated by the driver assistance system with the actual spacing. It is known for this purpose to determine the actual spacing by means of a global positioning system using a differential signal (DGPS). This procedure, however, required cost-intensive hardware. In addition, a test track used in the calibration or validation has to be separately measured beforehand to determine the absolute positions of the road markings. This further drives up the costs for the calibration or validation and furthermore means that public roads are only suitable for the calibration or validation by means of DGPS with restrictions.

SUMMARY OF THE INVENTION

It is an object of the invention to provide a simpler and more economic method for determining the location of a vehicle feature of a vehicle relative to an environmental feature located in an environmental zone of the vehicle feature.

This object is satisfied by a method in accordance with claim 1. The method specifically comprises the steps: arranging a camera at the vehicle with a fixed orientation relative to the vehicle such that the vehicle feature and an environmental zone of the vehicle feature are disposed in the field of view of the camera; generating an index in the environmental zone of the vehicle feature for the determining of the location of the vehicle feature relative to an environmental feature located in the environmental zone; taking at least one measurement image during the travel of the vehicle by means of the camera or generating at least one measurement image from an image taken by the camera, wherein the measurement image includes the vehicle feature, the index and an environmental feature located in the environmental zone of the vehicle feature; and determining the location of the vehicle feature relative to the environmental feature with reference to the position of the environmental feature relative to the index in the measurement image.

The method in accordance with the invention for the location determination only requires inexpensive equipment for its carrying out, namely essentially only a camera and means for generating an index. Cost-intensive hardware, in particular for the absolute position determination by means of a DGPS, is dispensable, in contrast. A commercial camera can be used as the camera, in particular a video camera, e.g. an action camcorder, from the area of consumer goods. The camera can be arranged behind the vehicle feature such that the camera looks in the direction of travel. Alternatively, the camera can be arranged in front of the vehicle feature, with the field of view of the camera being directed to the rear. An observation of the vehicle feature by the camera essentially from above is also possible.

Since the camera for carrying out the method can e.g. be arranged in front of or behind a tire and thus within the loading gauge of the vehicle, the method can also be used on public roads. It is therefore not restricted to dedicated test tracks which are only available to a limited extent and are cost-intensive to rent.

The method in accordance with the invention for the location determination can e.g. be used in a calibration referencing, gauging and/or validation of a driver assistance system. The named purposes are simplified and accelerated by the method in accordance with the invention. A calibration or recalibration can also be carried out using the method in accordance with the invention for a location determination e.g. by workshop staff who have no access to a known system for the location determination such as DGPS. Even if a customer of the driver assistance system for a validation of the system requires a location determination by means of DGPS, the method in accordance with the invention can nevertheless be used in a cos-saving manner for the location determination at least during the development and integration of the driver assistance system.

A further advantage of the method in accordance with the invention for the location determination is that the determining of the location is independent of the type and form of a lens or of an objective of the camera. Even if the index is visible with distortion in the measurement image for perspective reasons or due to a lens curvature, the further objects visible in the measurement image and in particular the environmental feature have the same perspective and lens-dependent distortion. It is thus not necessary to remove the lens curvature in the location determination by calculations e.g. by a data processing device. This is in particular advantageous when the camera is to be arranged beneath the vehicle. For only a little space for a camera arrangement is available beneath a vehicle so that the camera has to be equipped with a wide-angle objective In many application scenarios of the method. In particular wide-angle objectives, however, cause a particularly strong image distortion, in particular in the marginal region of an image.

In accordance with an embodiment, the production of the index and the production of the measurement image comprise the steps: (a) placing a measuring scale at the vehicle feature with a stationary vehicle; (b) taking a source image including the vehicle feature and the measuring scale by the camera; (c) removing the measuring scale from the vehicle feature; (d) taking at least one intermediate image by the camera during travel of the vehicle, wherein the intermediate image includes the vehicle feature and an environmental feature located in the environmental zone of the vehicle feature; and (e) at least partly superposing the source image and the intermediate image on the measurement image such that the measuring scale is visible in the measurement image at that point at which it was taken in the source image and the environmental feature taken by the intermediate feature is visible in the measurement image.

The measuring scale, e.g. a ruler or a yardstick, has an index which is made visible in the measurement image. Since the index is displayed at the point in the measurement image at which it was taken in the source image, the viewer of the measurement image can especially trust this method for the location determination, in particular if he also placed the measuring scale himself. In other words, the method is only based on reference objects which the viewer can actually see or has actually seen, which e.g. allows a particularly customer-friendly validation of a driver assistance system.

The method can be carried out with any desired lenses or objectives of the camera by a pixel-accurate transfer of the measuring scale from the source image into the measurement image.

The placing of the measuring scale preferably comprises a positioning of the measuring scale on a base on which the vehicle stands. The base thus forms a simple and reliable reference for the placing of the measuring scale. The measuring scale is advantageously placed substantially transversely, in particular perpendicular, to a longitudinal axis of the vehicle. In other words, the measuring scale can be arranged in parallel with the transverse axis of the vehicle. In particular the lateral spacing of the vehicle feature relative to the environmental feature can thus be simply and reliably determined.

In accordance with an alternative embodiment, the index is, for example, projected onto a base section in the environmental zone of the vehicle feature by a laser system and/or by a projector, in particular during the travel of the vehicle. The measurement image is in this respect an image taken by the camera. In this embodiment, no computer-assisted data processing of images taken by the camera is required. Instead, the location of the vehicle feature relative to the environmental feature can be read off directly in an image taken by the camera. In addition, an apparatus for carrying out the method can be arranged in a space-saving manner and in particular fully beneath the vehicle in accordance with this embodiment so that the loading gauge of the vehicle is admittedly not exceeded from a construction aspect, but the index is nevertheless visible on the other side of the loading gauge, namely where an environmental feature is to be expected.

In accordance with an embodiment, a spacing between the vehicle feature and the environmental feature is determined as the location. The spacing is of special interest in many application scenarios of the method in accordance with the invention for the location determination such as in the validation of a lane keeping assist. The spacing can in this respect simply be read off at the index. The spacing is preferably measured transversely to a longitudinal axis of the vehicle, in particular perpendicular to the longitudinal axis or in parallel with a transverse axis of the vehicle. The transverse spacing of the vehicle feature and thus of the vehicle relative to the environmental feature can thus be simply determined.

The vehicle feature can be a tire of the vehicle. A tire can easily be made visible in a camera image and it is possible to attach the camera to a lower side of the vehicle without exceeding the loading gauge of the vehicle from a construction aspect, i.e. without the camera projecting laterally. A further advantage of the tire as the reference object is that the tire lies on a base on which the vehicle stands. In this manner, a measuring scale can in particular be placed simply and with a high precision at the tire, which further simplifies the carrying out of the method and increases the accuracy of the measurement result.

The environmental feature can e.g. be a road marking or road boundary, a road strip boundary and/or a highway line such as a broken line or a solid line. These types of environmental features are termed road markings in summary in the following. For example, the relative location of the vehicle feature relative to the road marking is of particular interest when a lane keeping assist provided in the vehicle is to be calibrated or validated. In practice, road markings can be of extremely different quality. For example, the road markings can have different shapes and colors in different countries. Furthermore, road markings can have faded differently or be dirty. The method can, however, nevertheless be carried out in this case provided that the road marking is still visible to a certain degree for a viewer. The accuracy or the reliability of a lane keeping assistant can thus e.g. still be validated even with a poor quality of the road marking.

In accordance with a further embodiment, the measurement image, and optionally the intermediate image forms a frame of a measurement video frequency or of an intermediate video sequence. In other words, the location determination not only takes place with reference to a single measurement Image, but rather with reference to a plurality of measurement images, namely with reference to the measurement video sequence, whereby the location of the vehicle feature relative to the environmental feature can be observed continuously and optionally live during the travel of the vehicle over a longer period of time. If the production of the index in the measurement video sequence takes place by projection into the environmental zone by means of a laser system or of a projector, the measurement video sequence can be a live video sequence. If the index is removed from a previously taken source image and artificially inserted into the intermediate images, the intermediate video sequence can be a live video sequence.

The determining of the position of the environmental feature relative to the index in the measurement image preferably comprises a reading off of the index at the point at which the environmental feature contacts or intersects the index in the measurement image. The location of the vehicle feature relative to the environmental feature can likewise be read off directly at the index. The index can e.g. comprise a centimeter division having particularly high-contrast markings so that, for example, a spacing between the tire and the road marking can be read off particularly simply, in particular by a data processing device or a human observer.

A further subject of the invention is a method for comparing a location of a vehicle feature calculated by a driver assistance system relative to an environmental feature located in an environmental zone of the vehicle feature with an actual location of the vehicle feature relative to the environmental feature. This method advantageously makes use of the above-described method for determining the actual location and e.g. allows a particularly simple calibration and/or validation of the accuracy and/or reliability of a driver assistance system.

In accordance with an embodiment, the calculated location is also shown in the measurement image. The calculated location and the actual location for a viewer can thereby be read off simultaneously in a particularly comfortable manner. The calculated location can in this respect be presented in the measurement image by a visual output unit arranged at the vehicle and in the field of view of the camera. It is an advantage here that the visual output unit is attached to the vehicle and can thus be simply connected to the driver assistance system, e.g. via a CAN bus. The measurement image can simultaneously be output independently of the vehicle. It is thereby possible to connect the camera directly to an image display such as a smart phone and to output the measurement image, whereas neither the camera nor the image display have to be connected to the driver assistance system.

In accordance with a further embodiment, additional information of the driver assistance system is shown in the measurement image. The additional information can, for example, comprise time markings, diagnosis data of the driver assistance system, synchronization information and/or file names for the taken images and are preferably output by means of a visual output unit arranged at the vehicle and in a field of view of the camera and are shown together with the calculation location in the measurement image.

The calculated location and/or additional information of the driver assistance system can be displayed at least in part in the form of a computer-readable coding and/or of a computer-readable pattern, in particular in the form of a barcode or a QR code. A great deal of information can thereby be displayed in the measurement image in a space-saving manner and can be automatically evaluated e.g. by a data processing device. The coding can in particular be taken and evaluated by a data processing device over the duration of an intermediate video sequence and/or measurement video sequence. The comparison between the calculated and the actual location can thus be entered over time e.g. in a diagram, whereby e.g. a validation can be carried out even more accurately and can be better documented. The calculated location and/or the additional information can, however, also be displayed in the form of numbers, letters and/or binary characters whereby they can be read off better by a viewer.

The measurement image is preferably displayed by an image display. The comparison of the calculated location with the actual location is thereby made possible in a comfortable manner for a viewer of the image display. The image display can e.g. comprise a monitor directly connected to the camera or a wirelessly connected mobile computer such as a smart phone or a tablet PC.

The driver assistance system can comprise a lane keeping assist and/or a lane departure warning assistant The spacing between the tire or the vehicle and a road marking is of special importance for both types of driver assistance systems. The driver assistance system can work automatically or semi-automatically, with camera assistance and/or radar assistance, and can also comprise other sub-systems which detect the location of the environmental features relative to the vehicle for safety purposes. Examples for this include a radar system for monitoring a blind spot of a vehicle, a radar-assisted cornering assistant and a radar-assisted emergency braking assistant.

In accordance with an embodiment, the driver assistance system calculates the location of the vehicle feature relative to the environmental feature on the basis of images taken by a second camera, in particular by a front camera. The vehicle feature is in this respect in particular disposed outside the field of view of the second camera. The driver assistance system thus does not require any additional sensors for determining the location of the vehicle feature relative to the environmental feature.

A further subject of the invention is furthermore an apparatus for comparing a location of a vehicle feature calculated by a driver assistance system relative to an environmental feature located in an environmental zone of the vehicle feature with an actual location of the vehicle feature relative to the environmental feature, by which apparatus the above advantages can be achieved accordingly.

Further advantageous embodiments of the invention can be seen from the dependent claims, from the description and from the drawings.

BRIEF DESCRIPTION OF DRAWINGS

The invention will be described in the following only by way of example with reference to the schematic drawings.

FIG. 5 shows a measurement image of a further embodiment of a method in accordance with the invention for a location comparison.

DETAILED DESCRIPTION

Figure 1:
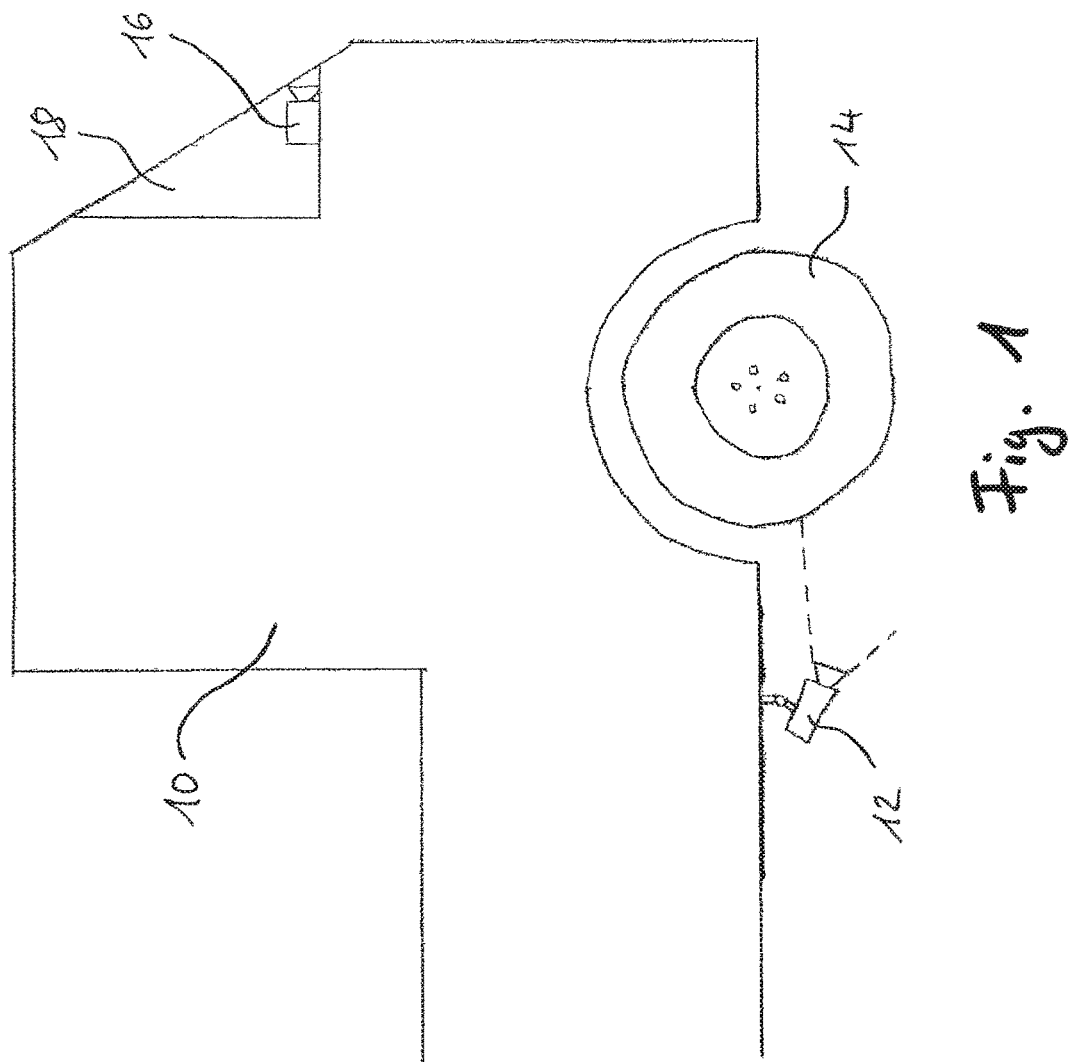
FIG. 1 shows elements of an embodiment of the apparatus in accordance with the invention.

A vehicle 10 is shown in FIG. 1 which has a lane keeping assist which is not shown. A camera 12 is arranged with a fixed orientation at the lower side of the vehicle 10 such that a tire 14 of the vehicle 10, in the present case a front tire, and an environmental zone of the tire 14 are disposed in the field of view of the camera 12. The field of view of the camera 12 is indicated by dashed lines. The camera 12 in the present embodiment is arranged behind the tire 14 and looks to the front, i.e. in the direction of travel. It is, however, alternatively just as possible to arrange the camera 12 in front of the tire 14 and to direct the field of view of the camera 12 to the rear to the tire 14, i.e. to have the camera look opposite to the direction of travel.

The vehicle 10 furthermore has a front camera 16 for the taking of images of the vehicle surroundings disposed in front of the vehicle 10. The front camera 16 is arranged behind a windshield 18 of the vehicle 10 and is connected to the lane keeping assist of the vehicle 10. The lane keeping assist determines the extent of a road disposed in front of the vehicle 10 in a manner known per se during travel of the vehicle 10 from the images taken by the front camera 16 and calculates from this the spacing of the vehicle 10, in particular of the tire 14, from a lateral road marking 20, e.g. a side strip, not shown in FIG. 1. The front camera 16 can admittedly not "see" either the tire 14 or any other lateral boundary of the vehicle 10, but the location of the front camera 16 is known with respect to the vehicle 10 and to the tire 14. The lane keeping assist can therefore predict the spacing between the tire 14 and the road marking 20. The term "predict" in this respect relates to the fact that the portion of the road marking 20 which the front camera 16 can see at a specific point in time is only reached later in time by the tire 14.

In contrast to the calculations of the lane keeping assist, the actual spacing between the tire 14 and the road marking 20 can be determined using the camera 12. The actual spacing can then be compared with the spacing calculated by the lane keeping assist, e.g. for the purpose of a calibration or validation of the lane keeping assist.

Figure 2:
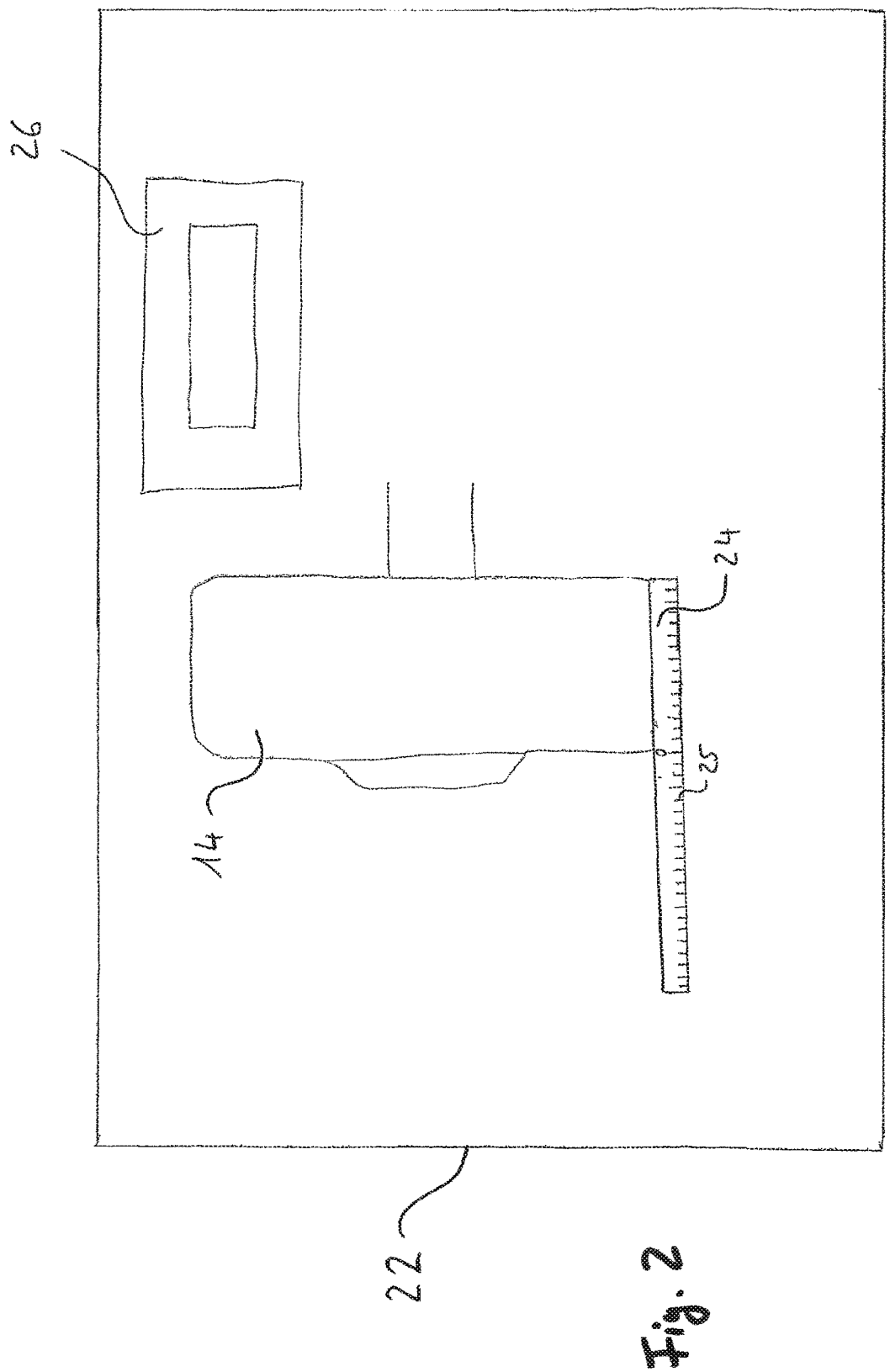
FIG. 2 shows a source image in accordance with an embodiment of a method in accordance with the invention for a location comparison.

For this purpose, a measuring scale 24 is first placed at the tire 14 (FIG. 2) in the standing state of the vehicle 10, in other words with a stationary vehicle 10. The measuring scale 24 is specifically placed on the ground on which the tire 14 and thus the vehicle 10 stand and is arranged in parallel with the transverse axis or at a right angle to the longitudinal axis of the vehicle 10. The measuring scale 24 has an index 25 and is aligned with a zero point of the index 25 at an outer margin of the tire 14, the left margin in FIG. 2. The index 25 extends from the outer margin of the tire 14 both outwardly and inwardly. A negative spacing between the road marking 20 and the outer margin of the tire 14 can thereby also be detected when the tire 14 has driven over the road marking 20. The arrangement of the measuring scale 24 relative to the tire is taken by the camera 12 and delivers a source image 22 which is shown in FIG. 2.

In addition to the tire 14 and the measuring scale 24, a visual output unit 26 is also visible in the source image 22 and is attached to the lower side of the vehicle 10 in the field of view of the camera 12 and inwardly disposed from the tire 14. The visual output unit 26 is connected to the lane keeping assist of the vehicle 10, for example via a CAN bus. During the travel of the vehicle 10, the output unit 26 indicates the spacing between the tire 14 and the road marking 20 calculated by the lane keeping assist. It does not display any output in the source image 22 since the vehicle 10 is stationary at the time of taking of the source image 22 and the lane keeping assist consequently does not calculate any spacing.

Figure 3:
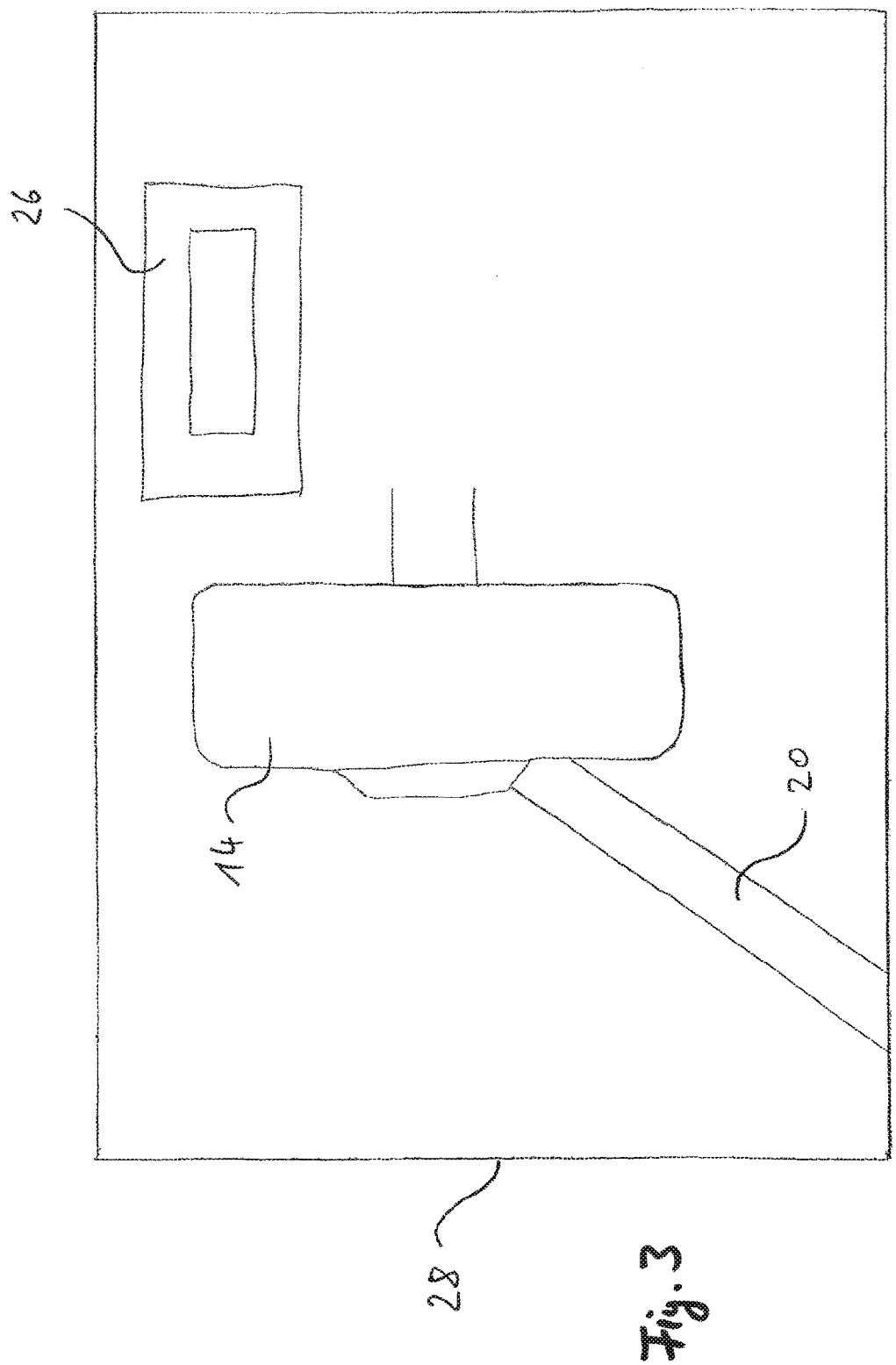
FIG. 3 shows an intermediate image in accordance with the embodiment of FIG. 2.

After the taking of the source image 22, the measuring scale 24 is removed from the field of view of the camera 12 again. During a travel of the vehicle 10, the camera 12 now takes images of the tire 14 and of the environmental zone of the tire 14, including the output unit 26 which do not include any measuring scale 24 and which are here called intermediate images 28. An example for such an intermediate image 28 is shown in FIG. 3 and shows, in addition to the tire 14 and to the visual output unit 26, a road marking 20 from which the tire 14 has a specific spacing. The spacing of the tire 14 from the road marking 20 calculated by the lane keeping assist is displayed by the visual output unit 26 and can thus be read off in the intermediate image 28. In the present embodiment, the intermediate image 28 form a frame of an intermediate video sequence which is taken during the travel of the vehicle.

Figure 4:
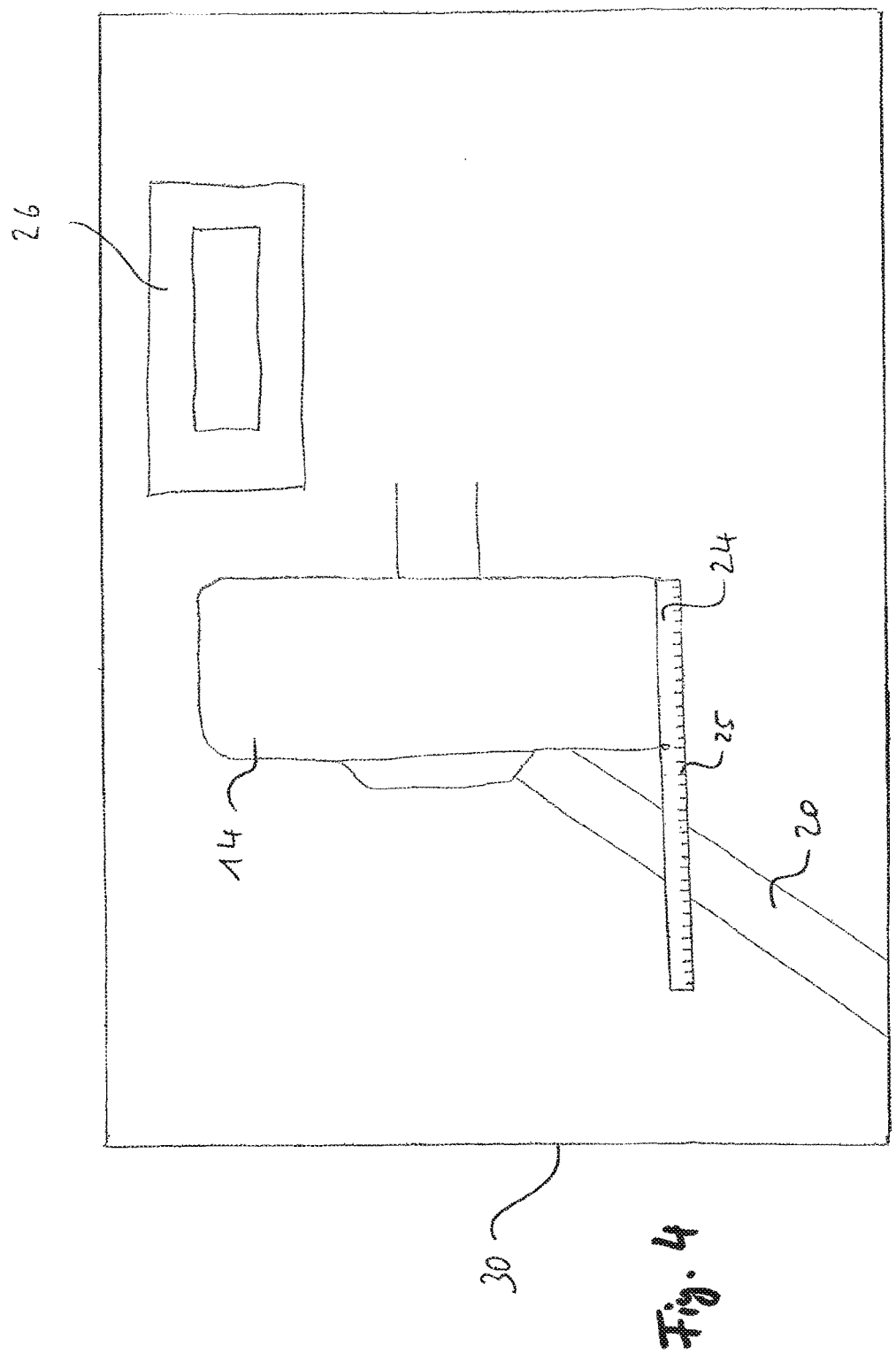
FIG. 4 shows a measurement image in accordance with the embodiment of FIGS. 2 and 3.

The intermediate image 28 for forming a measurement image 30 has the source image 22 superposed on it for a check of the spacing between the tire 14 and the road marking 20 calculated by the lane keeping assist. A resulting measurement image 30 is shown in FIG. 4 and shows the tire 14, the road marking 20, the visual output unit 26 and furthermore the measuring scale 24. The measurement image 30 in other words therefore ultimately corresponds to the intermediate image 28 with an additional representation of the measurement stick 24. The measurement image 30 can form a frame of a measurement video sequence in accordance with the intermediate image 28.

To produce the measurement image 30, the measuring scale 24 of the source image 22 is specifically extracted from the source image 22 with the aid of a data processing unit and is subsequently placed "over the intermediate image 28" by calculations so that it has exactly the same location relative to the image margins in the measurement image 30 as in the source image 22.

A viewer of the measurement image 30 can simply read off the actual spacing of the tire 14 from the road marking 20 at the index 25 of the measuring scale 24, and indeed at the point at which the inner margin—right margin in FIGS. 3 and 4—of the road marking 20 intersects the measuring scale 24. The spacing calculated by the lane keeping assist at the time of the taking of the measurement image 30 can simultaneously be read off at the visual output unit 26. The calculated spacing and the actual spacing can therefore be compared comfortably with one another live and at any time in a measurement video sequence.

FIG. 5 shows a measurement image 30 which was produced in accordance with an alternative method. In this alternative method, the index for reading off the actual spacing between the tire 14 and the road marking 20 is not provided by a previously taken index 25, but is rather projected on to the ground in the environmental zone of the tire 14 by means of a laser system or projector. The index here specifically comprises a plurality of equidistant light dots which are arranged along an imaginary line which is oriented in parallel with the transverse axis or at a right angle to the longitudinal axis of the vehicle 10. This method therefore differs from the previously described method in that a source image 22 with a measuring scale 24 is not first taken with a stationary vehicle and subsequently the source image 22 is superposed on intermediate images 28, but that the images taken by the camera 12 during the travel already include the light index 25 projected onto the ground and thus directly form measurement images 30 in which the actual spacing and the calculated spacing between the tire 14 and the road marking 20 can be read off and compared with one another.

If the road marking 20 does not form a solid line, but rather, for example, a broken line such as a highway line, the spacing can in principle also be determined by a projection of the road marking 20 in parallel with its inner margin onto the measuring scale 24. In practice, the ratio between the speed at which the actual spacing between the tire 14 and the road marking 20 changes and the speed at which a line space is passed, is normally so favorable, however, that it is possible to "wait" for the next visible line section before the actual spacing is read off, without the precision of a validation of the calculated spacing between the tire 14 and the road marking 20 being significantly impaired.

The visual output unit 26 can display additional information beside the calculated spacing such as the time or time marks of a frame counter. The measurement image 30 can thereby be associated in time with an image of a front camera 16 of the lane keeping assist or with one of its calculation steps and no additional synchronization is necessary between the measurement image 30 and the image of the front camera 16. If the calculated spacing differs from the actual spacing, the point in time of the deviation can be compared in this manner with road conditions taken by the front camera 16. The state of a road marking 20 can thus, for example, be associated with the calculated spacing to examine the influence of dirt on or wear of the road marking 20 on the calculation precision and on the reliability of the lane keeping assist.

The tire 14 can generally be a steerable tire 14, in particular a front tire. Even if the tire 14 in the measurement image 30 rotates, the measuring scale 24 remains where it was taken in the measurement image 30 and the method delivers reliable location information or spacing information. Lane keeping assists are furthermore generally primarily active at high speeds such as on a freeway. However, only small steering angles of the tire 14 are to be expected there which can be neglected within the framework of a desired precision of the method in accordance with the invention.

To be able to check all the time steps of the lane keeping assist in a reliable manner, it is advantageous if the camera 12 takes at least twice as many frames per second than the front camera 16, e.g. 60 frames per second. The frame rates of the camera 12 and of the front camera 16 can, however, also be the same in principle and can e.g. amount to 30 frames per second in each case.

While this invention has been described in terms of the preferred embodiments thereof, it is not intended to be so limited, but rather only to the extent set forth in the claims that follow.

We claim:

1. A method for determining a location of a vehicle feature (14) of a vehicle (10) relative to an environmental feature (20) located in an environmental zone of the vehicle feature (14), the method comprising the steps:

arranging a camera (12) at the vehicle (10) with a fixed orientation relative to the vehicle (10) such that the vehicle feature (14) and an environmental zone of the vehicle feature (14) are disposed in the field of view of the camera (12);

generating an index (25) in the environmental zone of the vehicle feature (14) for determining the location of the vehicle feature (14) relative to an environmental feature (20) located in the environmental zone;

taking at least one measurement image (30) during the travel of the vehicle by means of the camera (12) or generating at least one measurement image (30) from an image taken by the camera (12), wherein the measurement image (30) includes the vehicle feature (14), the index (25) and an environmental feature (20) located in the environmental zone of the vehicle feature (14); and determining the location of the vehicle feature (14) relative to the environmental feature (20) with reference to the position of the environmental feature (20) relative to the index (25) in the measurement image (30), wherein the generating of the index (25) and the generating of the measurement image (30) comprise the steps:

placing a measuring scale (24) at the vehicle feature with a stationary vehicle (10);

taking a source image (22) by the camera including the vehicle feature (14) and the measuring scale (24);

removing the measuring scale (24) from the vehicle feature (14);

taking at least one intermediate image (28) by the camera (12) during a travel of the vehicle (10), wherein the intermediate image (28) includes the vehicle feature (14) and an environmental feature (20) located in the environmental zone of the vehicle feature (14); and at least partly superposing the source image (22) and the intermediate image (28) on the measurement image (30) such that the measuring scale (24) is visible in the measurement image (30) at that point at which it was taken in the source image (22) and the environmental feature (20) taken with the intermediate image (28) is visible in the measurement image (30).

2. The method in accordance with claim 1, wherein the placing of the measuring scale (24) comprises a positioning of the measuring scale (24) on a base on which the vehicle (10) stands; and/or in that the measuring scale (24) is placed substantially transversely, in particular perpendicular, to a longitudinal axis of the vehicle (10).

3. The method in accordance with claim 1, wherein the index (25), is projected, in particular by a laser system and/or by a projector, onto a base section in the environmental zone of the vehicle feature (14) and the measurement image (30) is an image taken by the camera (12).

4. The method in accordance with claim 1, wherein a spacing, in particular a spacing measured transversely and/or perpendicular to a longitudinal axis of the vehicle (10), between the vehicle feature (14) and the environmental feature (20) is determined as the location.

5. The method in accordance with claim 1, wherein the vehicle feature (14) is a tire of the vehicle (10); and/or in that the environmental feature (20) is a road marking or a road boundary.

6. The method in accordance with claim 1, wherein the intermediate image (28) and/or the measurement image (30) form frames of respective intermediate video sequences or measurement video sequences.

* * * * *